(12) United States Patent
Arbogast et al.

(10) Patent No.: US 10,530,602 B2
(45) Date of Patent: Jan. 7, 2020

(54) OPERATING A HIGHLY AVAILABLE AUTOMATION SYSTEM

(71) Applicants: Hans-Jürgen Arbogast, Ursensollen (DE); Thomas Grosch, Roßtal (DE)

(72) Inventors: Hans-Jürgen Arbogast, Ursensollen (DE); Thomas Grosch, Roßtal (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 16/129,723

(22) Filed: Sep. 12, 2018

(65) Prior Publication Data

US 2019/0081812 A1 Mar. 14, 2019

(30) Foreign Application Priority Data

Sep. 13, 2017 (EP) ..................................... 17190886

(51) Int. Cl.
*H04L 12/28* (2006.01)
*G06F 11/20* (2006.01)

(52) U.S. Cl.
CPC ........ *H04L 12/283* (2013.01); *G06F 11/2023* (2013.01); *G06F 11/2097* (2013.01)

(58) Field of Classification Search
CPC .................................................... H04L 12/283
USPC ....................................................... 370/225
See application file for complete search history.

(56) References Cited

U.S. PATENT DOCUMENTS

| 2009/0100292 A1* | 4/2009 | Kleyer ............... G05B 19/0423 714/13 |
| 2013/0286820 A1 | 10/2013 | Angst et al. |
| 2015/0095690 A1 | 4/2015 | Grosch et al. |

(Continued)

FOREIGN PATENT DOCUMENTS

| EP | 2544058 A1 | 1/2013 |
| EP | 2661023 A1 | 11/2013 |

(Continued)

OTHER PUBLICATIONS

Transition Networks, Media Redundancy Protocol (MRP) User Guide (Year: 2013).*

(Continued)

*Primary Examiner* — Peter G Solinsky
(74) *Attorney, Agent, or Firm* — Lempia Summerfield Katz LLC

(57) ABSTRACT

To achieve an automatic adjustment of a monitoring time in an automation system with a first automation device and a second automation device, at least one of the two automation devices operates a measuring program. A desired ring interruption is carried out by the measuring program by blocking a ring port in order thus to provoke a ring reconfiguration that utilizes a reconfiguration time. The blockage of the ring port is canceled again after the reconfiguration time has elapsed. The ring port is blocked again if the ring port has been opened by the ring reconfiguration, and all routing tables are deleted. As a result of this, at least the peripheral units are triggered to learn new network routes. Runtimes of test telegrams are measured, and a maximum value of the measured runtimes is stored. The measured maximum value is used for a dynamic adjustment of the monitoring time.

16 Claims, 6 Drawing Sheets

(56) References Cited

U.S. PATENT DOCUMENTS

2015/0154130 A1* 6/2015 Grosch .................. G05B 9/03
710/50

FOREIGN PATENT DOCUMENTS

| EP | 2857913 A1 | 4/2015 |
| EP | 2993540 A1 | 3/2016 |

OTHER PUBLICATIONS

European Search Report for corresponding Application No. 1719088.6.6-1204, dated Apr. 4, 2018 with English Translation.
European Search Report for corresponding Application No. 1719088.6.6-1204, dated Apr. 4, 2018.

* cited by examiner

OPERATING A HIGHLY AVAILABLE AUTOMATION SYSTEM

This application claims the benefit of EP 17190886.6, filed on Sep. 13, 2017, which is hereby incorporated by reference in its entirety.

BACKGROUND

The present embodiments relate to operating a program-controlled highly available automation system for a technical process.

A system is considered to be highly available if an application continues to be available in the event of a fault and may be used further without immediate human intervention. A user may perceive no or only a minimal interruption. If an automation device is to fail in the case of a highly available automation system, the system seamlessly switches to the second automation device in order to control the technical process. High availability accordingly signifies the ability of a system to provide unrestricted operation in the event of failure of one of its components.

Both automation devices use the ring for a communication both for data exchange with the peripheral units and also for the exchange of synchronization information. One essential measure in a redundant automation system is the mutual monitoring of the subsystems (e.g., the automation devices) using a watchdog, which identifies, via a timeout, whether the respective other subsystem (e.g., automation device) has failed. A "failover" (e.g., the takeover of the process control by one of the two subsystems in the event of the failure of one of the two subsystems) may be carried out together with internal diagnosis measures.

The shorter the timeout is set for the watchdog, the quicker a "failover" maybe carried out. The minimal timeout to be selected for the watchdog is to take into account the conditions of the communication infrastructure. By way of example, the following embodiment may be assumed for the communication ring: An MRP ring connects the two automation devices and the peripheral units. The MRP ring is configured according to IEC 62439-2. Communication provided via the MRP rings (e.g., multi redundancy protocol) makes it possible for the two automation devices to still communicate with one another via a protocol independent of the MRP ring, and in the process, to use existing ring segments in parallel, if necessary.

In order to cope with the failure of a ring segment (e.g., the failure of a peripheral unit), the MRP ring responds with a ring reconfiguration. With such a ring reconfiguration, no communication between the two automation devices is possible under certain circumstances for time periods of differing lengths. The maximum time period determines the minimal value of the watchdog timeout for the mutual monitoring of the two automation devices. This time period depends inter alia on the devices used in the MRP ring. Since devices in the MRP ring may be replaced during the service life of the system, the length of the communication interruption to be expected may also change. This makes a dynamic adjustment of the timeout necessary or requires inspection of the timeout, in order to promptly identify a possible worsening of the failover times.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for a dynamic adjustment of monitoring times for the synchronization in a redundant automation system is provided.

A measuring program is operated at least in one of the two automation devices. A desired ring interruption is carried out by a blocking of a ring port by the measuring program in order thus to provoke a ring reconfiguration that utilizes a ring reconfiguration time. Using the measuring program, after the reconfiguration time has elapsed, the blockage of the ring port blocked by the measuring program is canceled again, whereupon the ring port, which was operated previously blocked so that circulating telegrams in the ring are prevented, is blocked again if the ring port has been opened by the ring reconfiguration and all routing tables are deleted. As a result of this, at least the peripheral units are triggered to learn new network routes. Runtimes of test telegrams are measured by the measuring program, and a maximum value of the measured runtimes is stored. The measured maximum value is now used for a dynamic adjustment of the monitoring time. Without the dynamic adjustment in the method of the present embodiments, the monitoring time (e.g., watchdog timeout) may be adjusted to the maximum duration of the ring interruption to be expected, which renders the failover times unnecessary. This results in the use of the highly available automation system not being possible in certain, time-critical applications.

An advantageous application of the method is provided with an initial operation of a highly available system, because an optimal monitoring time may thus be determined. Alternatively, it is also advantageous to use the method if, following a ring failure (e.g., with a subsequent repair and/or replacement of peripheral units), the physical conditions of the ring have changed.

The properties of the ring subscribers may have changed, for example, after repair of the ring, possibly longer cables have been fed in, or the replacement of a ring subscriber with another version number and another internal software has provided that runtimes are longer.

An MRP ring may be used to couple the two automation devices and the peripheral unit, and one of the two automation devices is operated as an MRP manager, and the other automation device, as well as all remaining peripheral units, in each case operate as an MRP client.

The MRP manager blocks one of the corresponding ring ports, within the scope of the ring design, in order to prevent circulating telegrams in the ring. The functionality for dynamically adjusting the monitoring times is realized in the automation device that the MRP client role occupies (e.g., accordingly the second automation device). The measuring program of the second automation device may be able to influence the ring ports of the second automation device such that a ring interruption may be provoked (port set to blocked).

In a further embodiment of the method, the first automation device may convey to the measuring program of the second automation device which of its two ring ports is operated as blocked, and the measuring program may block the ring ports of the second automation device according to the following rule: If the first ring port of the first automation device is blocked, the second ring port of the second automation device is blocked for a ring interruption; and if the second ring port of the first automation device is blocked, the first ring port of the second automation device is blocked for a ring interruption.

On account of the blocked ring port of the first automation device, the ring breaks down into a first ring segment and a second ring segment. Accordingly, the ring is operated in a first ring segment and a second ring segment, and as a result, an interruption in the ring may be identified because with an interruption, the second automation device may then only communicate with the first automation device via one of the two ring segments.

If a change in the monitoring time has been identified and the monitoring unit has changed toward larger values, a warning is generated for a user of a highly available automation system.

DETAILED DESCRIPTION

Figure 1:
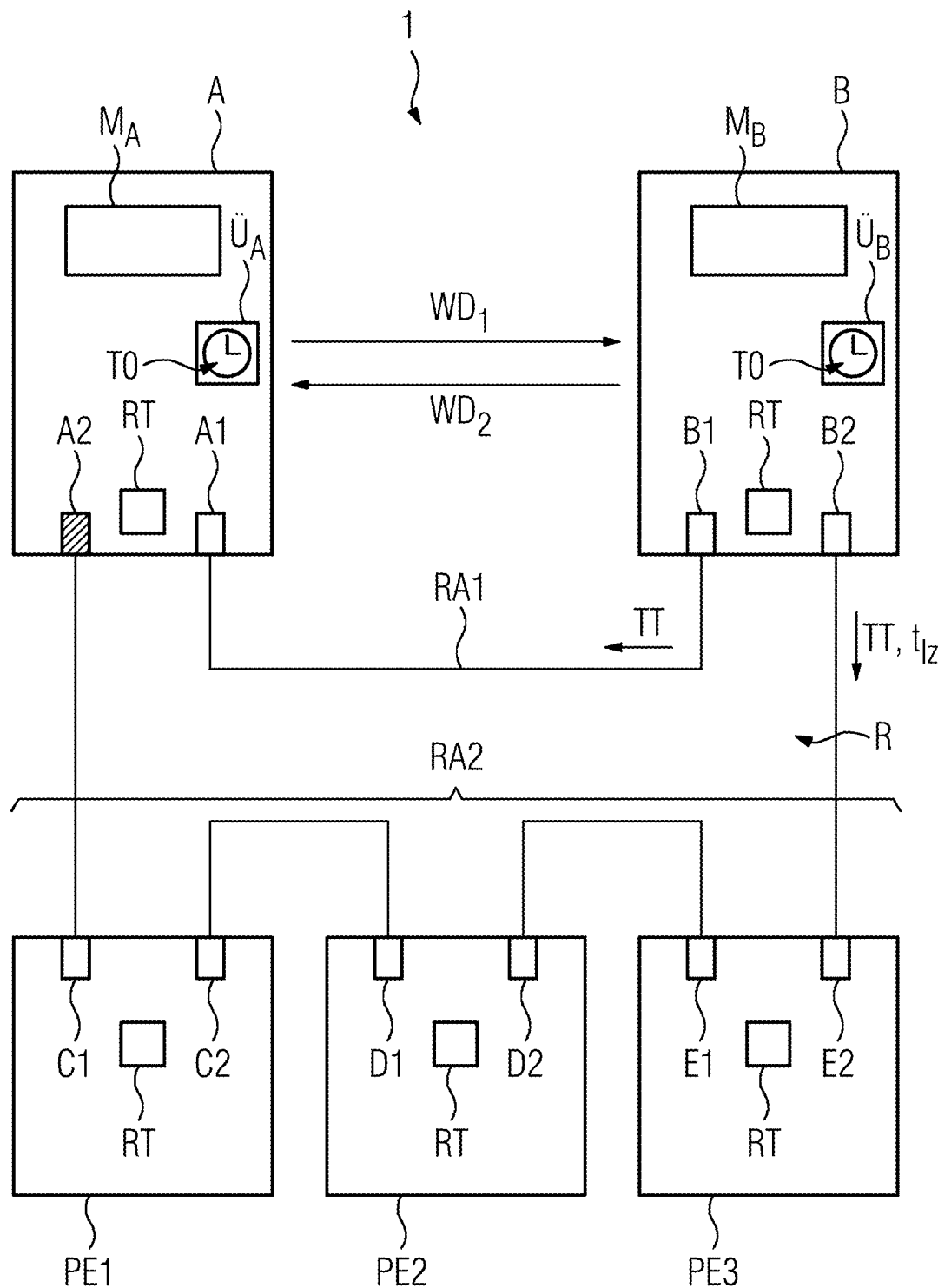
FIG. 1 shows one embodiment of a highly available automation system.

According to FIG. 1, a highly available automation system 1 is shown. The highly available automation system 1 includes a first automation device A, a second automation device B, a first peripheral unit PE1, a second peripheral unit PE2 and a third peripheral unit PE3. For communication purposes, the automation devices A, B and the peripheral units PE1, PE2, PE3 are connected with one another via a ring R.

In terms of communication, a media redundancy protocol (MRP) for the existing ring topology is used on the ring R. The medium redundancy protocol is a protocol for highly available networks, as are used in critical automation applications. The availability is increased by integrating redundancy. MRP allows individual failures to be compensated in a simple ring topology. Since no meshed topologies are assisted, MRP is deterministic and simpler than route spanning tree protocol (RSTP).

The MRP is based on a ring topology and provides recovery times between 200 ms and 500 ms (depending on configuration). MRP uses a redundancy manager that closes the ring. During normal operation, the redundancy manager verifies the continuity of the ring by special test packets. The redundancy manager does not forward packets, however, and therefore prevents these from circulating endlessly in the ring.

If a subscriber or a line fails, the test packets transmitted to a port are no longer received at another port. From now on, the redundancy manager forwards the packets in both directions and informs the subscribers of the topology change, so that the subscribers do not send packets over the interrupted path but instead via the redundancy manager.

Accordingly, in accordance with FIG. 1, the first automation device A is configured as an MRP manager and the second automation device B is configured as an MRP client. The peripheral units PE1, PE2, PE3 are likewise configured as the MRP client. For the physical formation of the ring R, the first automation device A has a first ring port A1, which is connected to a first ring port B1 of the second automation device B. A second ring port B2 of the second automation device B is in turn connected to a second ring port E2 of the third peripheral unit PE 3. A first ring port E1 of the third peripheral unit PE3 is connected to a second ring port D2 of the second peripheral unit PE 2. A first ring port D1 is in turn connected to a second ring port C2 of the first peripheral unit PE1. A first ring port C1 of the first peripheral unit PE1 is connected to a second ring port A2 of the first automation device A. As a result of this, in principle, the ring R physically closes.

In order to carry out the method, the first automation device A has a first measuring program $M_A$ and the second automation device B has a second measuring program $M_B$. With the highly available automation system 1, one of the two automation devices A, B may preferentially control a technical process via the peripheral units PE1, PE2, PE3, and the two automation devices A, B mutually monitor for failure of the respective other automation device A, B. A monitoring request WD1 from the first automation device A to the second automation device B and a second monitoring request WD2 from the second automation device B to the first automation device A is to be responded to within a monitoring time T0. To this end, the automation devices A, B each have a monitoring unit $Ü_A, Ü_B$. A watchdog function is realized in the monitoring units $Ü_A, Ü_B$ in each case, and monitoring is carried out based on the monitoring time T0.

The second ring port A2 of the first automation device A is operated as blocked, so that circulating telegrams in the ring R are prevented. The automation devices A, B and the peripheral units PE1, PE2, PE3 additionally have routing tables RT.

The two automation devices A, B use the ring R both for data exchange with the peripheral units PE1, PE2, PE3 and also for exchanging synchronization information. The mutual monitoring of the automation devices A, B using a watchdog identifies, via a timeout, whether the respective other automation device A, B has failed. Together with internal diagnosis measures, a "failover" (e.g., the takeover of the process controller by one of the two automation devices A, B) may be carried out in the event of failure of one of the two automation devices A, B.

The shorter the timeout is set for the watchdog, the quicker a "failover" may be carried out. The minimal timeout to be selected for the watchdog is to take into account the conditions of the communication infrastructure. For the communication, the MRP ring according to IEC 62439-2 is assumed to be an example of the following embodiments. It is assumed that the two automation devices A, B communicate with one another via a protocol independent of the MRP ring and in the process use a first ring segment RA1 and a second ring segment RA2 in parallel. On account of the blocked first ring port A2 of the second automation device A, the ring R is operated in a first ring segment RA1 and a second ring segment RA2, and as a result, an interruption of the ring R may be identified because with an interruption, the second automation device B may then only communicate with the first automation device A via one of the two ring segments RA1, RA2. In order to cope with a failure of a ring segment (e.g., the failure of a peripheral unit PE1, PE2, PE3), the MRP ring responds with a ring reconfiguration. With such a ring reconfiguration, no communication between the two automation devices A, B is possible under certain circumstances for a time period of differing lengths. The maximum length of this time period determines the minimal value of the watchdog timeout (e.g., the monitoring time T0) for the mutual monitoring of the two automation devices A, B. This time period depends inter alia on the devices used in the MRP ring. Since devices in the MRP ring may be replaced during the service life of the system or the highly available automation system for the system or for the technical process, the length of the communication interruption to be expected may also change. This makes a dynamic adjustment of the timeout or the monitoring time T0 necessary or requires inspection of the timeout in order to promptly identify a possible worsening of the failover times. In one embodiment, a method for operating a program-controlled, highly available automation system designed redundantly with a first automation device A and a second automation device B schedules a technical process, in which a new monitoring time to be measured is measured after a possible repair or replacement of a device and the monitoring time T0 is adjusted in the event of a change.

Figure 2:
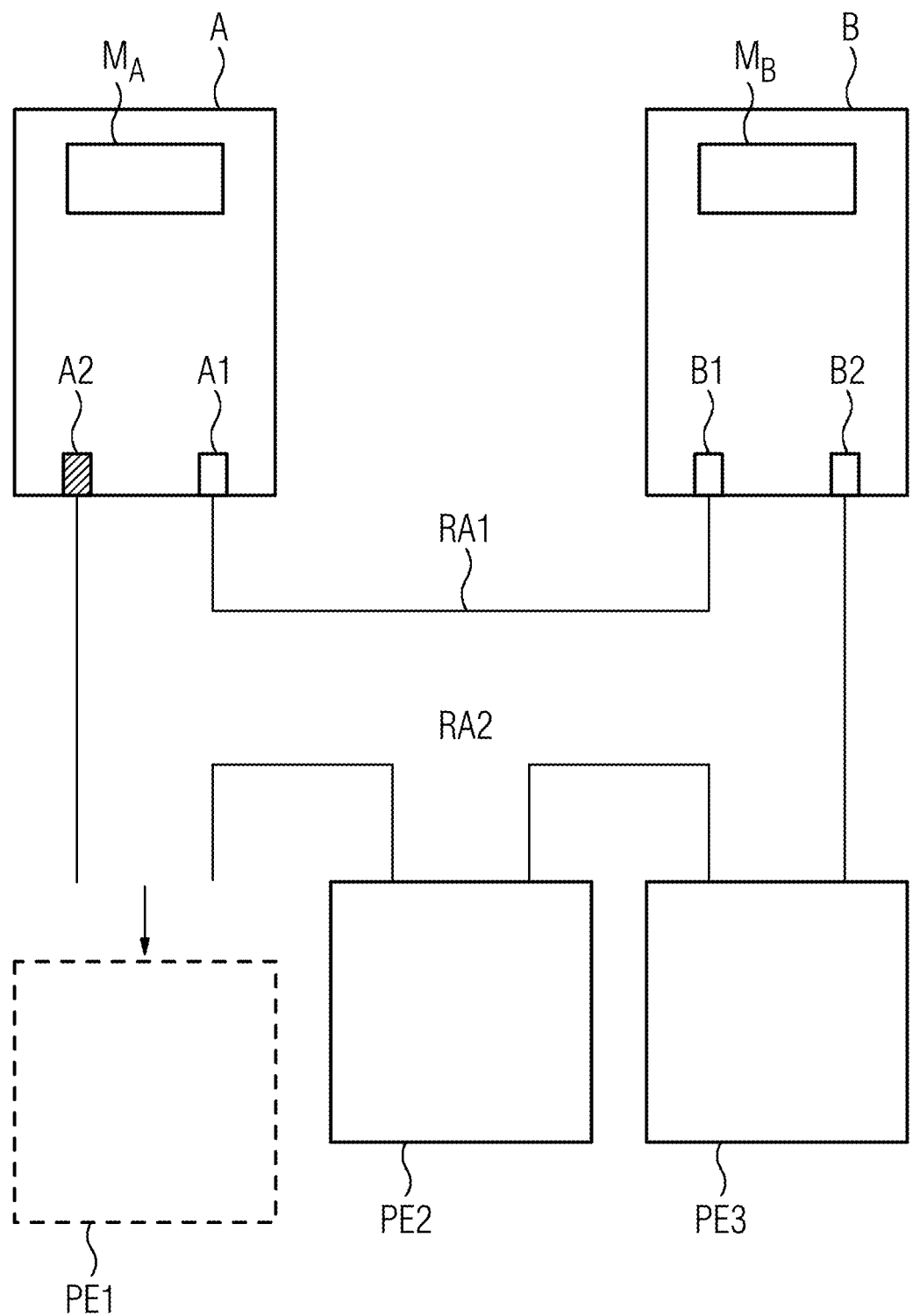
FIG. 2 shows the highly available automation system according to FIG. 1 in method act "identifying an interruption"

According to FIG. 2, it is shown how the second measuring program $M_B$ of the second automation device B identifies an interruption in the ring R. The interruption in the ring R is shown symbolically. As a result of this, the first peripheral unit PE1 has been removed. The second measuring program $M_B$ is configured to identify the interruption in the ring R, in that the first automation system A may then only communicate with the second automation system B via one of the two ring segments RA1 or RA2. The first measuring program $M_A$ may be programmed on the first automation device A such that the first measuring program $M_A$ may convey to the second measuring program $M_B$ on the second automation device B which ring port A1, A2 of the first automation system A is currently operated as blocked (e.g., port blocked).

Figure 3:
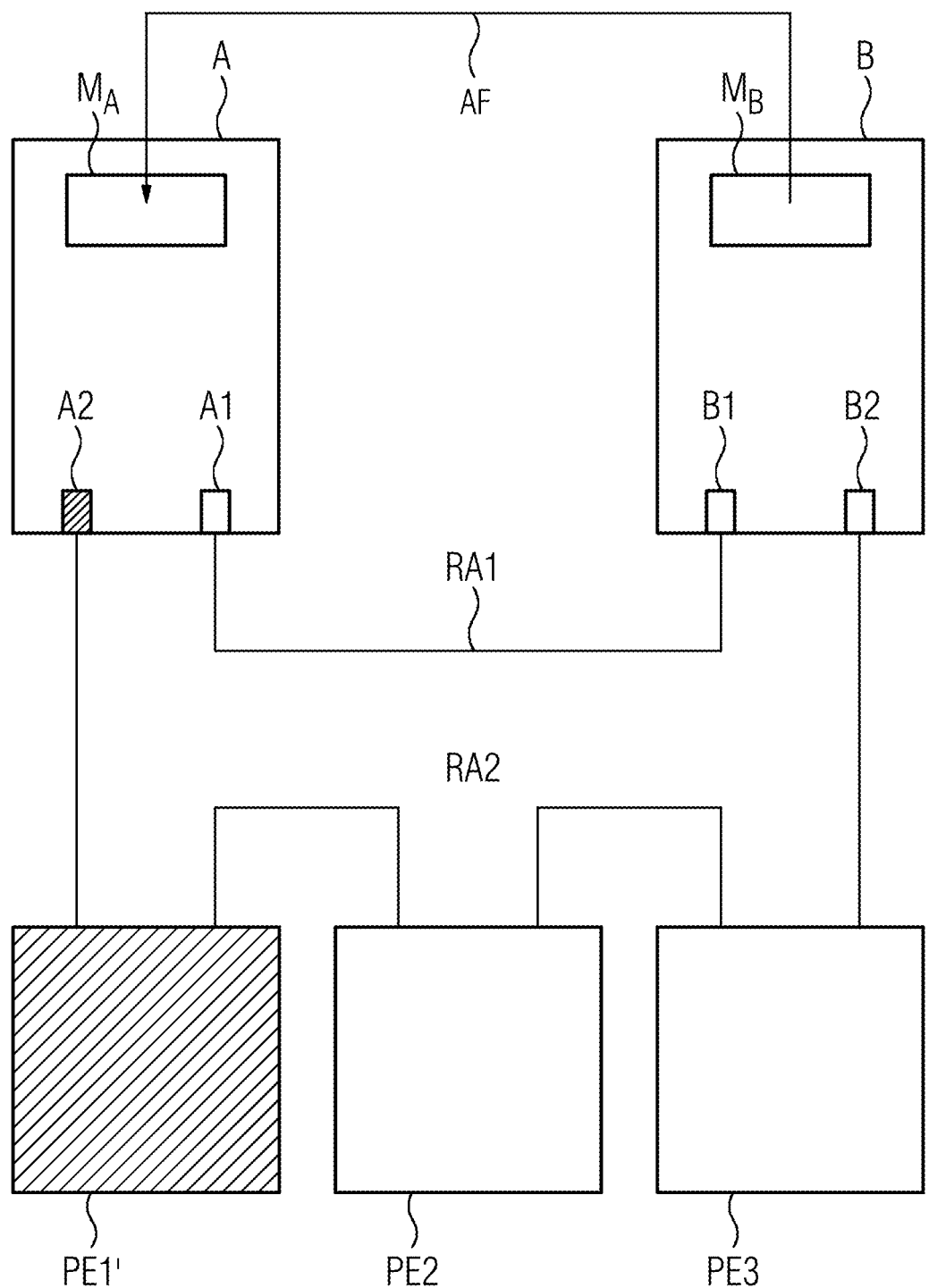
FIG. 3 shows exemplary identification of a successful repair.

A next method act is indicated with FIG. 3. In the first instance, the ring R is repaired. This is indicated symbolically in that a new first peripheral unit PEP has now been used (shown hatched). If the repair of the ring R has been identified by the second measuring program $M_B$ on the second automation device B, the second measuring program $M_B$ asks the first measuring program $M_A$ which ring port on the first automation device A is currently blocked.

The second measuring program $M_B$ is programmed such that the second measuring program $M_B$ may measure a measurement for possible new telegram runtimes Tu. The second measuring program $M_B$ only starts a measurement after a wait time. The wait time serves to allow for an update of the process values prior to the measurement, since two reconfigurations may possibly connect directly to one another on account of the measurement. The wait time is geared to the maximum projected update times of a possible Profinet periphery.

With a query AF, the second measuring program $M_B$ may ask the first measuring program $M_A$ which ring port A1, A2 is operated as blocked.

Figure 4:
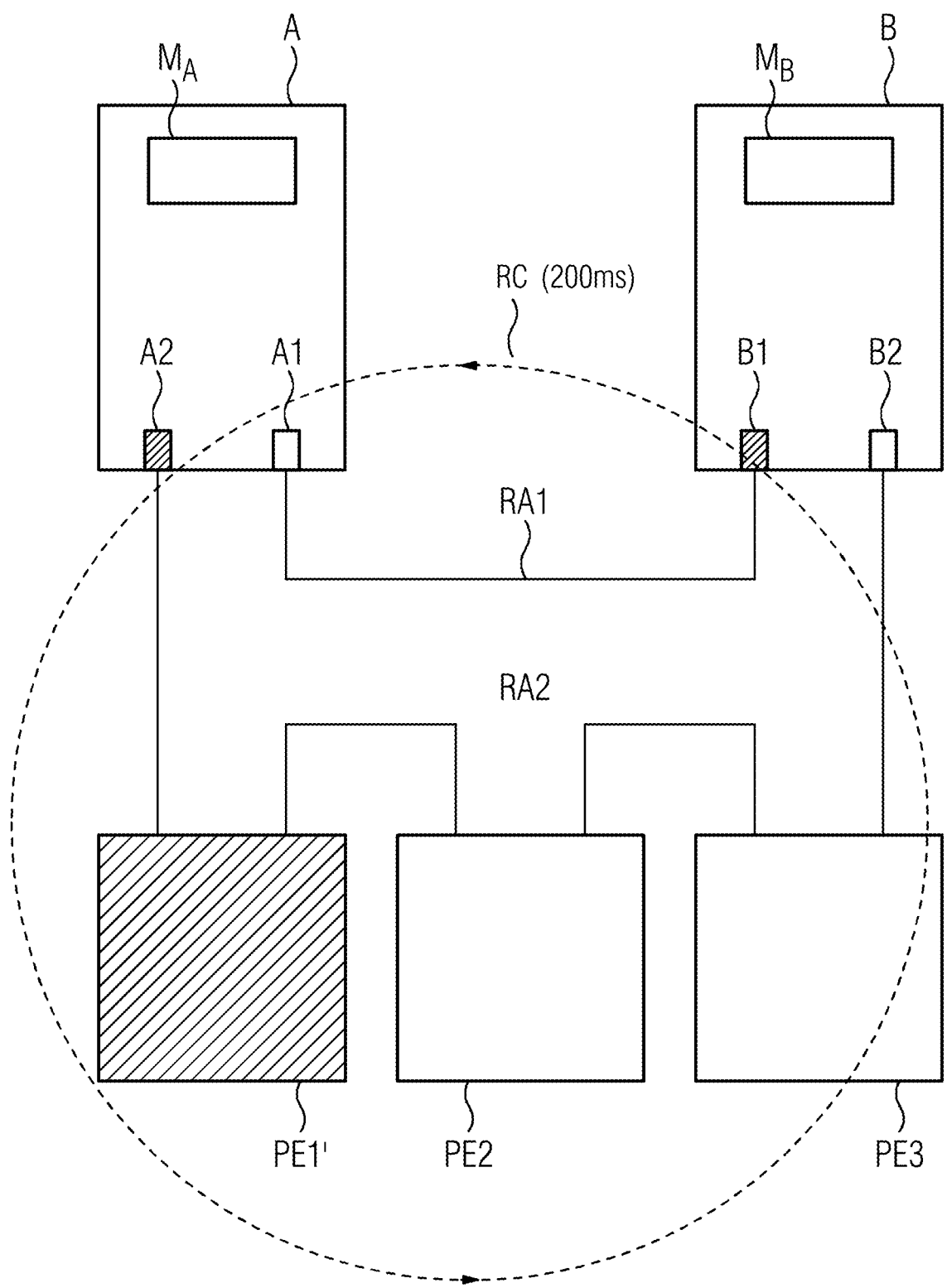
FIG. 4 shows a reconfiguration of the ring of the highly available automation system.

According to FIG. 4, it is shown how the second measuring program $M_B$ provokes a desired ring interruption by blocking the first ring port B1 of the second automation device B. This ring interruption utilizes a reconfiguration time of 200 ms. The reconfiguration RC of the overall ring R is indicated by a dashed line and extends across all connected subscribers.

Figure 5:
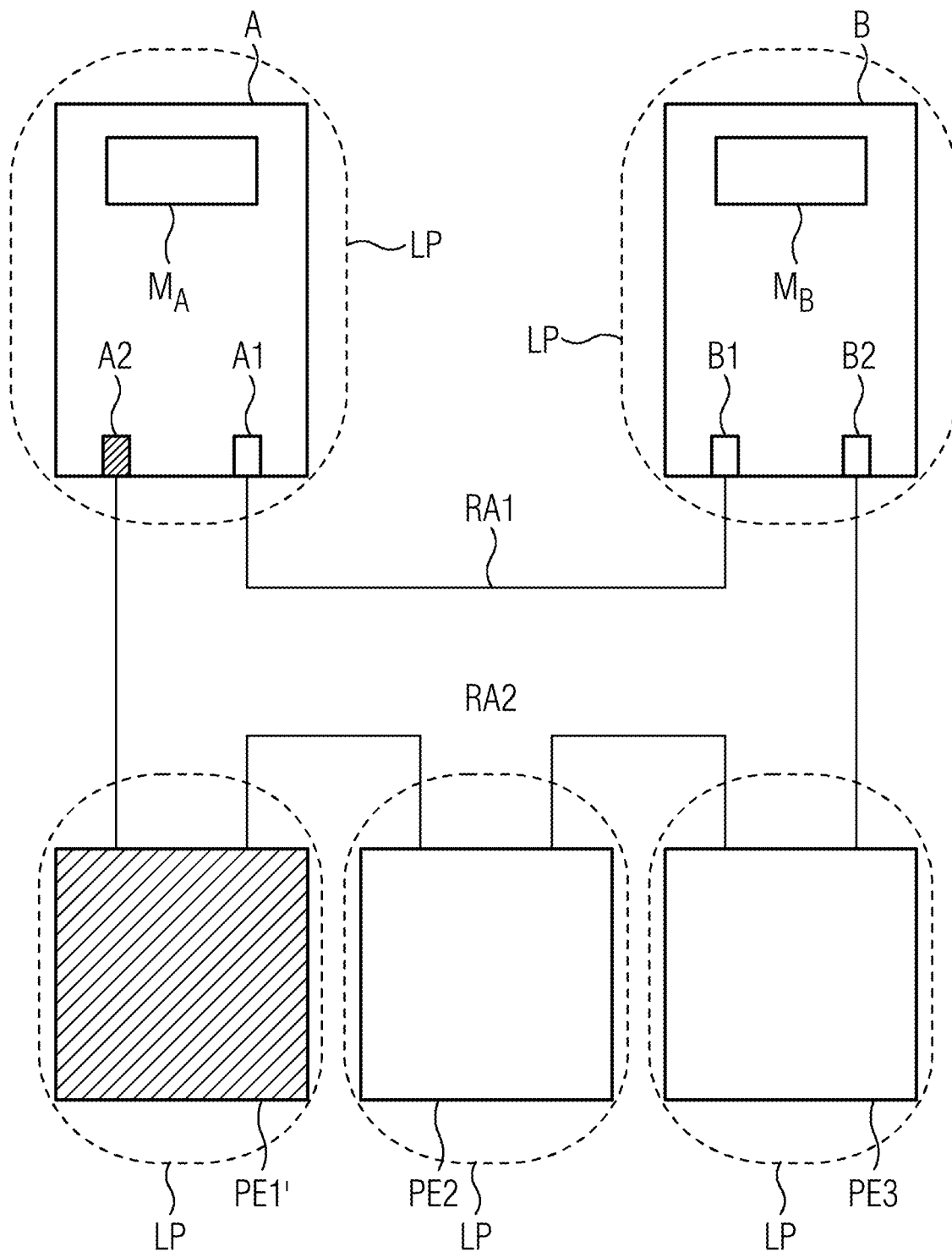
FIG. 5 shows an exemplary learning phase for learning new routing tables.

FIG. 5 shows how, after the reconfiguration time RC has elapsed, the blockage of the first ring port B1 blocked by the second measuring program $M_B$ is canceled again, and thereupon, the second ring port A2 of the first automation device A, which has previously been operated blocked, so that circulating telegrams in the ring R are prevented, is blocked again if the second ring port A2 has been opened by the ring reconfiguration. All routing tables RT are now deleted. As a result of this, at least the peripheral units PE1, PE2, PE3 are triggered to learn new network routes in a learning phase LP. With this learning of new network routes, runtimes of test telegrams TT are measured using the second measuring program $M_B$ (see representation in FIG. 1—transmission of test telegrams TT with telegram runtimes $T_{1z}$). A maximum value of the measured telegram runtimes $T_{1zmax}$ may be stored by transmitting the test telegrams TT and the measured telegram runtimes $T_{1z}$. The maximum value of the telegram runtimes $T_{1zmax}$ that is determined in this way is used for a dynamic adjustment of the monitoring time T0. This is indicated by arrows. As a result of this, the second measuring program $M_B$ enters a maximum telegram runtime $T_{1zmax}$ into the respective monitoring units $Ü_A, Ü_B$ as a monitoring time T0.

Figure 6:
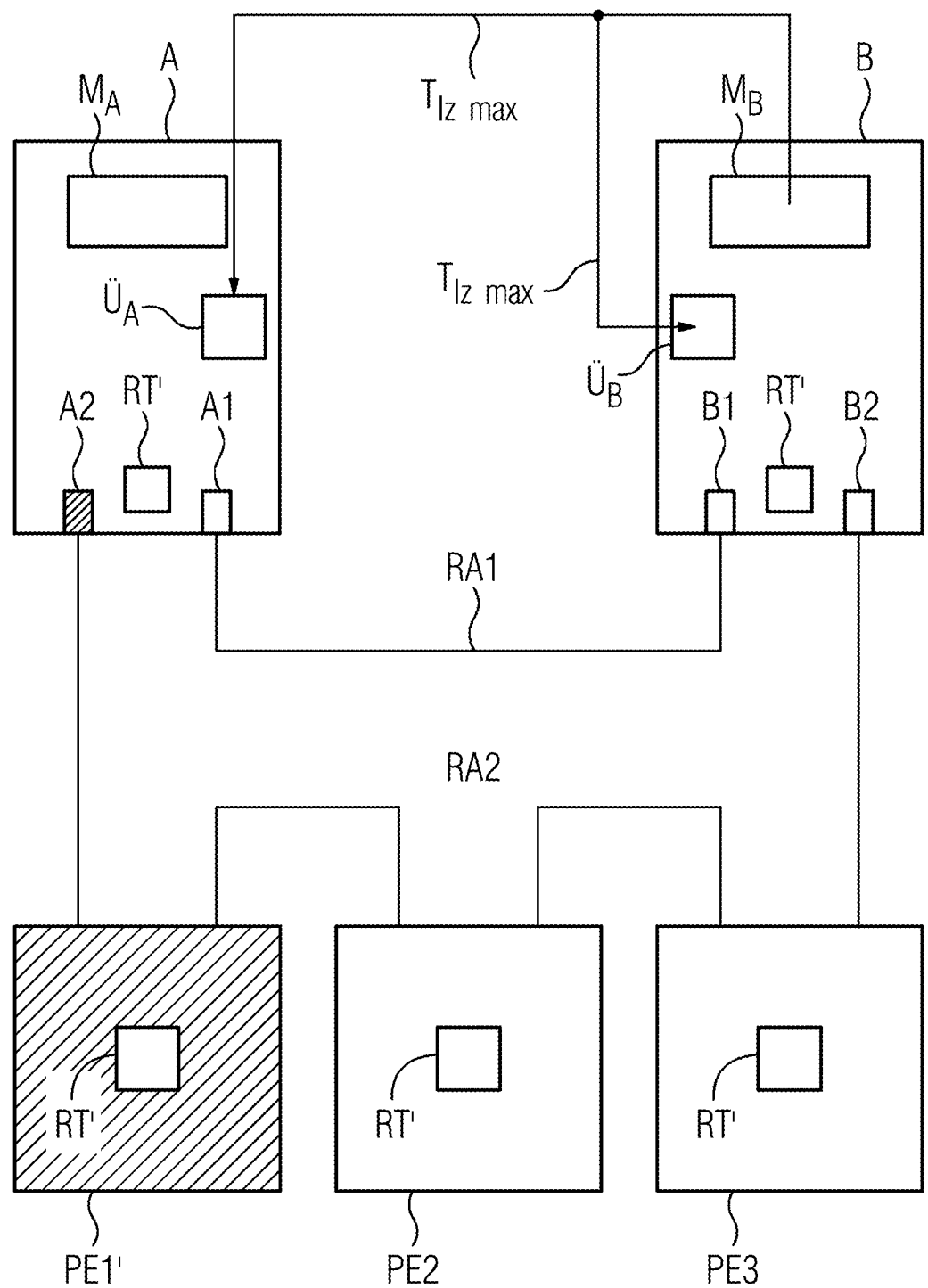
FIG. 6 shows an exemplary of the takeover of a maximum telegram runtime as a new monitoring time.

FIG. 6 shows that new updated, modified routing tables RT' are entered into the subscribers of the ring by the reconfiguration phase and the learning phase LP (see FIG. 5).

The method may be carried out with each initial operation of a system and after each ring interruption with a subsequent repair; with the repair, it is not to be ruled out that the properties of the ring subscriber have changed and these changes have an effect on the runtime of telegrams.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for operating a program-controlled highly available automation system configured redundantly with a first automation device and a second automation device, for a technical process, wherein one automation device of the first automation device and the second automation device preferentially controls the technical process via peripheral units, and the first automation device and the second automation device mutually monitor for failure of the respective other automation device of the first automation device and the second automation device, wherein a monitoring query from the first automation device to the second automation device, and vice versa, is to be responded to within a monitoring time, wherein for a communication, the first automation device and the second automation device, and the peripheral units are connected with one another via a ring, wherein the first automation device and the second automation device each have a first ring port and a second ring port in order to form the ring, wherein one ring port of the first ring ports and the second ring ports is operated as blocked so that circulating telegrams are prevented in the ring, wherein the first automation device and the second automation device, and the peripheral units also have routing tables, wherein a measuring program is operated in at least in one automation device of the first automation device and the second automation device, the method comprising:
- carrying out a desired ring interruption, the carrying out of the desired ring interruption comprising blocking, by the measuring program, a ring port to provoke a ring reconfiguration that utilizes a reconfiguration time;
- canceling, by the measuring program, the blockage of the ring port blocked by the measuring program after the reconfiguration time has elapsed;
- blocking the ring port that has previously been operated blocked so that circulating telegrams in the ring are prevented again when the ring port is opened by the ring reconfiguration and deleting all routing tables, and as a result of which at least the peripheral units are triggered to learn new network routes;
- measuring runtimes of test telegrams and storing, by the measuring programs, a maximum value of the measured runtimes; and
- using the measured maximum value for a dynamic adjustment of the monitoring time.

2. The method of claim 1, wherein the method is applied, with an initial operation, such that an optimal monitoring time is determined, or the method is applied following a ring failure with subsequent repair, replacement, or repair and replacement of the peripheral units.

3. The method of claim 1, wherein an MRP ring is used to couple the first automation device and the second automation device,
wherein some of the peripheral units and one automation device of the first automation device and the second automation device is operated as an MRP manager, and the other automation device of the first automation device and the second automation device, and the remaining peripheral units are operated as an MRP client, respectively.

4. The method of claim 2, wherein an MRP ring is used to couple the first automation device and the second automation device,
wherein some of the peripheral units and one automation device of the first automation device and the second automation device is operated as an MRP manager, and the other automation device of the first automation device and the second automation device, and the remaining peripheral units are operated as an MRP client, respectively.

5. The method of claim 1, wherein the first automation device is configured to convey to the measuring program of the second automation device which of the two ring ports of the first automation device is operated as blocked, and the measuring program blocks the ring ports of the second automation device according to the following rule:
- if the first ring port is blocked, the second ring port is blocked for a ring interruption; and
- if the second ring port is blocked, the first ring port is blocked for a ring interruption.

6. The method of claim 2, wherein the first automation device is configured to convey to the measuring program of the second automation device which of the two ring ports of the first automation device is operated as blocked, and the measuring program blocks the ring ports of the second automation device according to the following rule:
- if the first ring port is blocked, the second ring port is blocked for a ring interruption; and
- if the second ring port is blocked, the first ring port is blocked for a ring interruption.

7. The method of claim 3, wherein the first automation device is configured to convey to the measuring program of the second automation device which of the two ring ports of the first automation device is operated as blocked, and the measuring program blocks the ring ports of the second automation device according to the following rule:
- if the first ring port is blocked, the second ring port is blocked for a ring interruption; and
- if the second ring port is blocked, the first ring port is blocked for a ring interruption.

8. The method of claim 1, wherein on account of the blocked ring port of the first automation device, the ring is operated in a first ring segment and a second ring segment, and as a result, an interruption of the ring is identified because with an interruption the second automation device is operable to only communicate with the first automation device via one of the two ring segments.

9. The method of claim 2, wherein on account of the blocked ring port of the first automation device, the ring is operated in a first ring segment and a second ring segment, and as a result, an interruption of the ring is identified because with an interruption the second automation device is operable to only communicate with the first automation device via one of the two ring segments.

10. The method of claim 3, wherein on account of the blocked ring port of the first automation device, the ring is operated in a first ring segment and a second ring segment, and as a result, an interruption of the ring is identified because with an interruption the second automation device is operable to only communicate with the first automation device via one of the two ring segments.

11. The method of claim 5, wherein on account of the blocked ring port of the first automation device, the ring is operated in a first ring segment and a second ring segment, and as a result, an interruption of the ring is identified because with an interruption the second automation device is operable to only communicate with the first automation device via one of the two ring segments.

12. The method of claim 1, further comprising generating a warning for a user in the event of a change in the monitoring time to greater values.

13. The method of claim 2, further comprising generating a warning for a user in the event of a change in the monitoring time to greater values.

14. The method of claim 3, further comprising generating a warning for a user in the event of a change in the monitoring time to greater values.

15. The method of claim 5, further comprising generating a warning for a user in the event of a change in the monitoring time to greater values.

16. The method of claim 8, further comprising generating a warning for a user in the event of a change in the monitoring time to greater values.

* * * * *